US008612966B2

(12) United States Patent
Huff et al.

(10) Patent No.: US 8,612,966 B2
(45) Date of Patent: Dec. 17, 2013

(54) METHOD AND SYSTEM FOR PREPARING SOFTWARE OFFERINGS HAVING SOFTWARE APPLICATION CODE AND POST-INSTALL CONFIGURATION INFORMATION

(75) Inventors: David P. Huff, Raleigh, NC (US); James M. Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1344 days.

(21) Appl. No.: 11/947,074

(22) Filed: Nov. 29, 2007

(65) Prior Publication Data

US 2009/0144700 A1    Jun. 4, 2009

(51) Int. Cl.
G06F 9/445    (2006.01)

(52) U.S. Cl.
USPC ........................... 717/174; 717/175; 717/177

(58) Field of Classification Search
None
See application file for complete search history.

(56) References Cited

U.S. PATENT DOCUMENTS

| | | | |
|---|---|---|---|
| 5,450,545 A | | 9/1995 | Martin et al. |
| 5,555,416 A | | 9/1996 | Owens et al. |
| 5,835,777 A | * | 11/1998 | Staelin .......................... 717/175 |
| 6,032,184 A | | 2/2000 | Cogger et al. |
| 6,161,176 A | | 12/2000 | Hunter et al. |
| 6,167,567 A | | 12/2000 | Chiles et al. |
| 6,230,287 B1 | | 5/2001 | Pinard et al. |
| 6,239,800 B1 | | 5/2001 | Mayhew et al. |
| 6,282,711 B1 | | 8/2001 | Halpern et al. |
| 6,477,531 B1 | | 11/2002 | Sullivan et al. |
| 6,658,598 B1 | | 12/2003 | Sullivan |
| 6,718,366 B2 | | 4/2004 | Beck et al. |
| 6,744,450 B1 | | 6/2004 | Zimniewicz et al. |
| 6,785,834 B2 | | 8/2004 | Chefalas et al. |
| 6,910,072 B2 | | 6/2005 | Beck et al. |
| 6,973,647 B2 | | 12/2005 | Crudele et al. |
| 7,225,249 B1 | | 5/2007 | Barry et al. |
| 7,281,170 B2 | | 10/2007 | Taylor et al. |
| 7,523,082 B2 | | 4/2009 | Mohan |
| 7,594,225 B2 | * | 9/2009 | Barr et al. ..................... 717/174 |
| 7,669,199 B2 | * | 2/2010 | Cope et al. .................... 717/174 |

(Continued)

OTHER PUBLICATIONS

Papadopoulos et al. NPACI Rocks: tools and techniques for easily deploying manageable Linux clusters.Concurrency and Computation: Practice and Experience, Jun.-Jul. 2003, pp. 707-725, Retrieved on [Aug. 15, 2013] Retrieved from the Internet: URL< http://onlinelibrary.wiley.com/doi/10.1002/cpe.722/abstract>.*

(Continued)

Primary Examiner — Thuy Dao
Assistant Examiner — Cheneca Smith
(74) Attorney, Agent, or Firm — Lowenstein Sandler LLP

(57) ABSTRACT

Embodiments relate generally to a method of generating a post-installation configuration for a software application offering. The method includes receiving a request for a post-installation configuration for a software application and determining a software distribution in which the software application will operate. The method also includes determining a set of inter-dependencies between the software application and the software distribution and retrieving a set of templates for post-installation configuration of the software application. The method further includes generating a post-installation configuration file that customizes the software application for operation with the software distribution and packaging the software application into an offering that comprises the post-installation configuration file and the software application.

15 Claims, 4 Drawing Sheets

(56) References Cited

U.S. PATENT DOCUMENTS

| | | | |
|---|---|---|---|
| 7,685,591 B2* | 3/2010 | Barr et al. ................. | 717/169 |
| 7,765,541 B1* | 7/2010 | Noordergraaf et al. ....... | 717/175 |
| 7,805,676 B2 | 9/2010 | Schemers et al. | |
| 7,827,290 B2 | 11/2010 | Galvin et al. | |
| 8,001,542 B2 | 8/2011 | Edwards et al. | |
| 8,490,082 B2* | 7/2013 | Moore et al. ............... | 717/175 |
| 2002/0013833 A1 | 1/2002 | Wyatt et al. | |
| 2002/0129356 A1* | 9/2002 | Hellerstein et al. ........... | 717/177 |
| 2002/0138786 A1 | 9/2002 | Chefalas et al. | |
| 2003/0043178 A1 | 3/2003 | Gusler et al. | |
| 2003/0088616 A1 | 5/2003 | Etessami et al. | |
| 2004/0083206 A1 | 4/2004 | Wu et al. | |
| 2004/0088698 A1* | 5/2004 | Claiborne ................. | 717/174 |
| 2004/0250247 A1* | 12/2004 | Deeths et al. ............... | 717/175 |
| 2005/0034122 A1* | 2/2005 | Kung et al. ................. | 717/177 |
| 2005/0055692 A1* | 3/2005 | Lupini et al. ............... | 717/174 |
| 2005/0108703 A1 | 5/2005 | Heller | |
| 2005/0125788 A1 | 6/2005 | Lupini et al. | |
| 2005/0132354 A1 | 6/2005 | Edwards et al. | |
| 2005/0262501 A1 | 11/2005 | Marinelli et al. | |
| 2006/0010345 A1 | 1/2006 | Schnoebelen et al. | |
| 2006/0039547 A1 | 2/2006 | Klein et al. | |
| 2006/0123409 A1 | 6/2006 | Jordan et al. | |
| 2006/0123410 A1 | 6/2006 | Kapoor | |
| 2006/0123414 A1* | 6/2006 | Fors et al. ................. | 717/177 |
| 2006/0126801 A1 | 6/2006 | Laperi et al. | |
| 2006/0136895 A1* | 6/2006 | Barr et al. ................. | 717/168 |
| 2006/0253849 A1* | 11/2006 | Avram et al. ............... | 717/172 |
| 2006/0265706 A1 | 11/2006 | Isaacson et al. | |
| 2006/0277542 A1* | 12/2006 | Wipfel .................... | 717/174 |
| 2007/0043687 A1 | 2/2007 | Bodart et al. | |
| 2007/0083610 A1 | 4/2007 | Treder et al. | |
| 2007/0106984 A1* | 5/2007 | Birk Olsen et al. ........... | 717/174 |
| 2007/0271552 A1* | 11/2007 | Pulley .................... | 717/120 |
| 2008/0127171 A1 | 5/2008 | Tarassov | |
| 2008/0127175 A1* | 5/2008 | Naranjo et al. .............. | 717/174 |
| 2008/0141240 A1* | 6/2008 | Uthe ...................... | 717/174 |
| 2008/0154933 A1 | 6/2008 | Galvin et al. | |
| 2008/0155534 A1* | 6/2008 | Boss et al. ................. | 717/178 |
| 2008/0307413 A1 | 12/2008 | Ferris | |
| 2008/0320468 A1 | 12/2008 | Ferris | |
| 2009/0043669 A1 | 2/2009 | Hibbets et al. | |
| 2009/0043882 A1 | 2/2009 | Hibbets et al. | |
| 2009/0064131 A1 | 3/2009 | Ferris et al. | |
| 2009/0144700 A1 | 6/2009 | Huff | |

OTHER PUBLICATIONS

Venkatakrishnan et al. An Approach for Secure Software Installation. Proceedings of LISA '02: Sixteenth Systems Administration Conference, 2002, pp. 219-226. Retrieved on [Aug. 15, 2013] Retrieved from the Internet: URL<http://static.usenix.org/events/lisa2002/tech/full_papers/venkatakrishnan/venkatakrishnan_html/>.*

Non-Final Office Action for U.S. Appl. No. 11/848,815 mailed Apr. 20, 2011.

Final Office Action for U.S. Appl. No. 11/848,815 mailed Oct. 14, 2011.

Non-Final Office Action for U.S. Appl. No. 11/848,815 mailed Apr. 23, 2012.

Advisory Action for U.S. Appl. No. 11/848,815 mailed Jan. 11, 2012.

Advisory Action for U.S. Appl. No. 11/767,230 mailed Jan. 11, 2012.

Non-Final Office Action for U.S. Appl. No. 11/767,230 mailed Apr. 27, 2011.

Final Office Action for U.S. Appl. No. 11/767,230 mailed Oct. 27, 2011.

Non-Final Office Action for U.S. Appl. No. 11/767,230 mailed Feb. 28, 2012.

Final Office Action for U.S. Appl. No. 11/767,230 mailed Jul. 18, 2012.

Non-Final Office Action for U.S. Appl. No. 11/760,952 mailed Mar. 31, 2011.

Final Office Action for U.S. Appl. No. 11/760,952 mailed Oct. 26, 2011.

Non-Final Office Action for U.S. Appl. No. 11/760,952 mailed Feb. 23, 2012.

Advisory Action for U.S. Appl. No. 11/760,952 mailed Jan. 5, 2012.

Final Office Action for U.S. Appl. No. 11/760,952 mailed Aug. 10, 2012.

Advisory Action for U.S. Appl. No. 11/760,952 mailed Oct. 23, 2012.

Notice of Allowance for U.S. Appl. No. 11/760,952 mailed Feb. 13, 2013.

Non-Final Office Action for U.S. Appl. No. 11/947,074 mailed Mar. 25, 2013.

Advisory Action for U.S. Appl. No. 11/767,230 mailed Sep. 28, 2012.

Notice of Allowance for U.S. Appl. No. 11/848,815 mailed Oct. 1, 2012.

Cornwell et al. "Practical Optimization Considerations for Diagnostic Knowledge Representation" 1999, retrieved from <http://www.kirshenbaum.net/Evan/Pubs/krr.pdf>total pp. 8.

* cited by examiner

METHOD AND SYSTEM FOR PREPARING SOFTWARE OFFERINGS HAVING SOFTWARE APPLICATION CODE AND POST-INSTALL CONFIGURATION INFORMATION

FIELD

The embodiments relate to methods and systems for application installation and configuration. More particularly, the embodiments relate to methods and systems that automate installation and post-installation configuration for a plurality of applications.

DESCRIPTION OF THE RELATED ART

Today, it is common that enterprises must install and configure computer applications on their computer to tailor their computer for their particular needs. Such computer application installation and configuration can be as easy as a one step activation of an installation program. Typically, software applications can be installed quite easily with the well known tools, such as RPM for the Linux operating system.

However, more complex computer applications require post-installation configuration to complete their installation or to become a working application. Such post-installation configuration can be difficult. For example, post-installation configuration can require deep technical knowledge of parameters of a user's computer hardware, operating system parameters, network addressing, other computer programs installed on the user's computer, etc. Therefore, even if an application can be successfully installed, it can be difficult to make a software application filly functional. Indeed, it is common that a newly installed computer application will not execute at all or may not execute in the manner desired by the user.

Unfortunately, there are no known tools that simplify and automate post-installation configuration of applications. Even using a RPM package to install a desired software application, a user typically must manually perform a multitude of post-install tasks or configuration to ensure interpretability between the installed software and existing software. Post installation configuration can consist of several tasks, such as starting and stopping services, editing configuration files, setting up username and password accounts, creating new users and access controls, creating new databases, etc.

DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
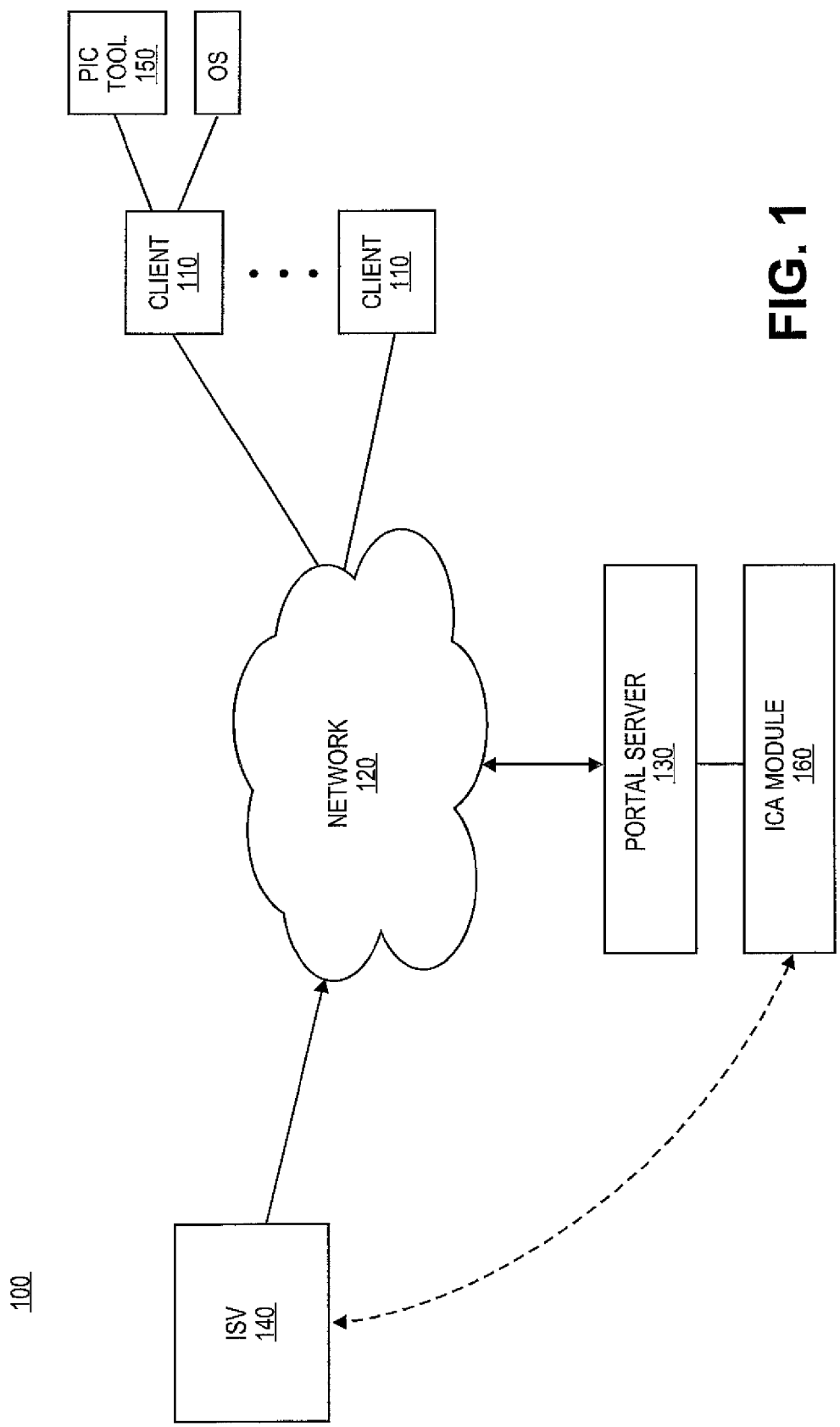
FIG. 1 shows a system that is in accordance with an embodiment of the present invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

The present invention provides systems and methods for creating and distributing post-installation configurations of software applications as part of a software "offering." Post-installation configuration relates to any installation and configuration tasks that need to be performed after the operating system and software are installed in order to make it operational and ready to use.

Conventionally, these tasks are performed manually using a command, program, script, or batch file. However, these methods are prone to error and are not scalable across a large number of devices.

The present invention provides a standardized tool and application programming interface for creating post-installation configuration (PIC) files. The tool accesses a database containing information about hardware, software, and network considerations that affect post-installation. The present invention also may provide a remote post-installation service. This remote service allows software vendors and administrators to host their PIC files on a network accessible location. During post-installation, the client may then access their PIC file at the network location. In addition to post-installation tasks, the remote post-installation service may be useful for upgrades, patches, and other types of software maintenance.

Once created, the PIC files may be packaged together with the software application into a single package called an offering. An offering is enhanced from a standard software package because it includes post-installation configuration information that makes a software application ready for use after it has been installed. Such configuration information may include, for example, starting and stopping of services, account usernames and passwords, operating system parameters, networking parameters, and the like. In contrast, standard software packages merely render the software package installed on a target computer, but does not make it ready for actual use.

Reference will now be made in detail to the present embodiments, examples of which are illustrated in the accompanying drawings. Wherever possible, the same reference numbers will be used throughout the drawings to refer to the same or like parts.

FIG. 1 shows a system 100 that is in accordance with an embodiment of the present invention. It should be readily apparent to those of ordinary skill in the art that the system 100 shown in FIG. 1 represents a generalized system illustration and that other components can be added or existing components can be removed or modified while still remaining within the spirit and scope of the present teachings. As shown in FIG. 1, the system 100 includes clients 110, a network 120, a portal server 130, and independent software vendors (ISVs) 140. These components and entities of FIG. 1 will now be briefly described.

The clients 110 operate the software applications and require the post-installation services of the present invention.

A client 110 can be one or more computing devices for an individual user, a small business owner, a user within a business or governmental entity, etc. The clients 110 can be based on well known platforms such as laptops, personal computers, workstations, servers, or other similar devices.

The clients 110 can interface through the network 120 via a network connection (not shown). For example, clients 110 can access the portal server 130 to retrieve desired software application(s) for installation and use. Client 110 can access the portal server 130 via known Internet communication protocols, e.g., Transmission Control Protocol/Internet Protocol (TCP/IP), using known Internet addressing schemes and web interfaces. The network connection can be a private network (e.g., a business network, an educational network, etc.), an Internet service provider or other similar interfaces means. In order to perform these functions, the client 110 may include a well known operating system, such as Windows, Linux, UNIX, MacOS, and the like.

As shown in FIG. 1, client 110 can also include a PIC tool 150 that can provide a common interface for post-installation. The PIC tool 150 may parse the information in the PIC file in the software offering and prompt a client 110 for information, if needed. The information provided by the user can then be used to supplement the post-install configuration.

The PIC tool 150 may be initiated once the PIC file is placed in a predefined location on the client 110 computing device. Alternatively, the PIC tool 150 may parse the software offering and access a location on network 120 indicated in the PIC file. For example, the PIC tool 150 may retrieve post-install configuration information at a Uniform Resource Locator (URL) specified in the PIC file of a software offering.

The PIC tool 150 can have both a GUI and text user interface (TUI) depending upon a user's run level. The PIC tool 150 can be a standalone application or component of another application. Because the PIC file is distributed from a central location, i.e., portal server 130, and standardized in its operation, for example, based on an application programming interface, the client 110 can perform post-installation configuration that is not ISV dependent.

The network 120 provides a communication infrastructure for the system 100. The network 120 can be a combination of local, wide area networks as well as private or public networks or combinations thereof. In some embodiments, the Internet can be used as the network 120.

The portal server 130 provides a point of control for hosting and distributing software offerings. The portal server 130 can be implemented with a variety of servers from manufacturers such as Dell, Hewlett-Packard, Sun Microsystems, etc. as known to those skilled in the art. The portal server 130 can store and execute a multi-user operating system such as Linux, Windows Enterprise, UNIX, or other operating systems known to those skilled in the art.

The portal server 130 can interface with the network 120 via a network interface such as private network, a wired connection, or other similar high throughput network interface. In some embodiments, the portal server 130 provides a web-interface or website that is readily accessible from the network 120.

The portal server 130 can store a plurality of software applications that client 110 can install on their computing device. For example, the portal server 130 may store executable files for the software applications or binary packages for the software applications.

The portal server 130 can also store PIC files(s) that can be transferred to a client 110 along with a software application to ease configuration of the software application. For example, the portal server 130 can store the PIC files as extensible markup language (XML) files in one or more databases.

In some embodiments, the portal server 130 can include an installation and configuration assistant ("ICA") module 160. This tool may be used as a developer service so that an ISV 140 can easily prepare and format post-install configuration tasks for their applications. Based on information provided to this tool, the portal server 130 can prepare and create the software offering of the present invention. For example, the ICA module 160 may provide an interface that assists a user at ISV 140 in selecting a software application, select how to automate distribution of the software application, how the PIC file is included and accessed as part of the software offering.

The ICA module 160 can be configured with a rule base or logic to provide a list of software applications that are available for installation. The ICA module 160 can also be configured to package a RPM package that includes the client 110 selected software application(s) and the PIC file(s) to assist in configuration of the selected software. For example, the PIC file can be a XML file or equivalent format that can describe what the software application requires to direct execution of a processor on client 110 and make the application ready for use after installation. The PIC file can describe what is prompted to a client 110, buffering any user supplied information and how to process any supplied information. The PIC file can be specific to varying degrees, such as, for each software application, a type of client 110, a type of user, a location of the client 110, and the like.

The ICA module 160 can be further configured to query a client 110 to input the parameters of the computer system of the client 110, i.e., a computing environment. For example, the ICA module 160 can generate a configuration GUI that allows a user to input parameters such as operation system type and version, central processing unit, amount of memory, installed applications, number of disk drives, number of users, security requirements, etc. The ICA module 160 can then use the client 110 inputted parameters to generate the PIC file.

The ISVs 140 represent the entities that generate and provide the software applications. In the present invention, the ISVs 140 may interface with the portal server 130 through the network 120 via a network connection (not shown). The network connection can be a private network (e.g., a business network, an educational network, etc.), an Internet service provider or other similar interfaces means.

The ISVs 140 can provide the parameters for the PIC file to be placed on the portal server 130. The ISVs 140 can use a web browser or other similar graphical user interface (GUI) widget to interact with the portal server 130. An ISV 140 can also use a developer tool to create the PIC file. The developer tool can have knowledge of what other software applications that exist on the portal service, what services those software applications provide and how to package them into the PIC file. The developer tool may thus assist an ISV 140 in developing a PIC file for their software application and customize how their application is made ready for use after installation.

Figure 2:
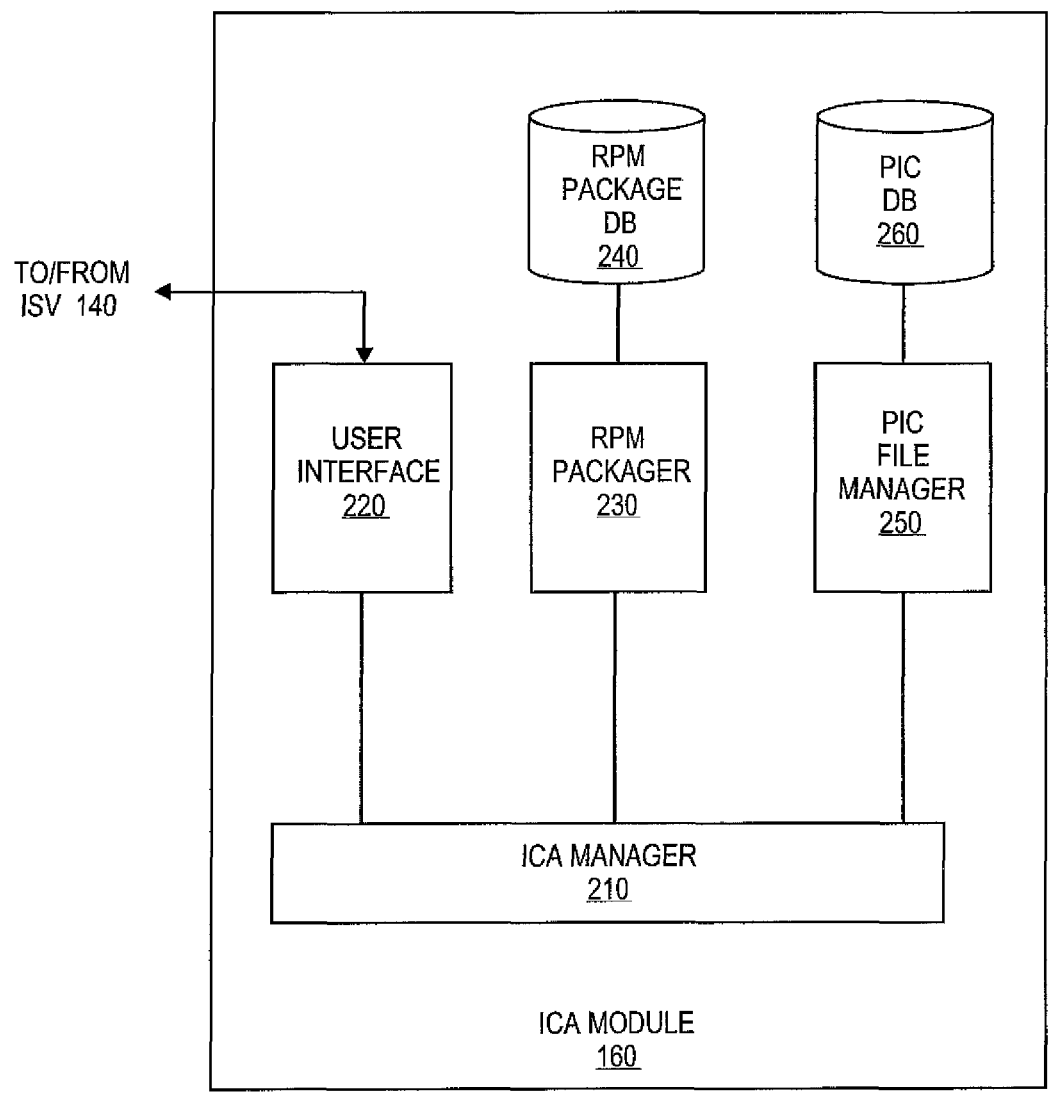
FIG. 2 shows a configuration assistance module that is in accordance with an embodiment of the present invention.

FIG. 2 shows a more detailed block diagram of the ICA module 160 from FIG. 1, in accordance with another embodiment of the present teachings. It should be readily apparent to those of ordinary skill in the art that the ICA module 160 shown in FIG. 2 represents a generalized system illustration and that other components can be added or existing components can be removed or modified while still remaining within the spirit and scope of the present teachings.

As shown in FIG. 2, the ICA module 160 can comprise an ICA manager module 210, a user interface module 220, a RPM packager 230, a RPM package database 240, a PIC file manager 250 and a PIC file database 260. These components of ICA module 160 will now be further described.

The ICA manager module 210 manages the operations of the ICA module 160. In some contexts, the ICA manager module 210 can be considered the main thread or routine that manages the data flow and processing sequences of data flowing throughout the ICA module 160.

The user interface module 220 can be configured to generate GUIs to retrieve information from a client 110 as well as provide the client 110 a mechanism for receiving information. The GUIs of the user interface module 220 can be written in, e.g., HTML, XML, Java, etc., as is known to those skilled in the art.

The user interface module 220, in some embodiments, can provide a selection GUT, which displays a list of available software applications (or applets) that are stored in the RPM package database 240. The selection GUT can include multiple checkboxes, each checkbox associated with a software application. A client 110 can mark the checkbox to indicate a selected software application. Alternately, the selection GUT can provide a client 110 with a drop down menu of a list of software applications that are stored in the RPM package database 240. The selection GUI can also include a GUI widget (e.g., a "Finish" button) to indicate to the ICA manager module 210 that the client 110 has completed the selection process. The user interface module 210 can pass the client 110 software application selections to the user ICA manager 205 for temporary storage.

The RPM packager 230 accepts the selections of software application(s) from the user interface module 210, retrieves the selected applications from the RPM database 240, and packages the software applications for inclusion in the software offering.

The RPM packager 230 may also be configured to retrieve a PIC file from the PIC file manager 250 and package the selected applications and the PIC file in a package as a software application. In some embodiments, RPM packager 230 is configured to provide an RPM-compatible package that serves as the software offering.

For example, once a software offering has been packaged, the ICA manager module 210 can direct the user interface module 220 to generate a results GUI (such as a webpage) that provides a link for the client 110 to download the software offering as a single file. Alternately, the software offering may comprise a set of links from which the software applications and PIC files can be downloaded and then executed individually in order to implement the software offering. Of course, a combination of these approaches may also be employed.

The RPM package database 240 provides a storage infrastructure that provides the various software applications made available by the portal server 130 for software offerings. The RPM package database 240 can be configured to automatically correlate and provide prerequisite software application(s) that may be required by and selected software application(s). For example, the RPM package database 240 may include one or more data structures that indicate various dependencies that may exist between software applications. Thus, working together with the RPM package database 240, the RPM packager 230 can automatically retrieve prerequisite software application(s) and package in the software offering, not only the requested software application files, but also the prerequisite software application(s) and the PIC file(s) retrieved from the PIC file database 230.

The PIC file manager 250 retrieves the PIC file(s) from the PIC file database 260. For example, PIC file manager 250 may formulate a database query with the client 110 software application selection(s). The PIC file manager 250 can issue the formulated database query to the PIC file database 260. In response, the PIC file database 260 may provide the requested PIC files that correspond to the formulated database query back to the PIC file manager 250.

The PIC file database 260 can be populated by the ISVs 140 using a web browser or other similar graphical user interface (GUI) widget to interact with the portal server 130. The ISVs 140 can interact with the user interface module 220 to establish a desire to populate the PIC file database 260. Their desire can be conveyed through an ISV GUI provided by the user interface module 220. The ISV GUI can provide a menu selection to allow the ISVs 140 to pass their created PIC file(s) to the PIC file database 260. The user interface module 220 can receive the ISV 140 PIC file(s) and transfer the PIC file(s) to the ICA manager 210. The ICA manager 210 can transfer the ISV 140 PIC file to the PIC file manager 250, which can store the ISV 140 PIC file(s) on the PIC file database 260.

PIC file database 260 provides a storage infrastructure for providing the PIC files offered by portal server 130. For example, an ISV 140 can use a developer tool provided by the portal server 130 to create the PIC file that populates the PIC file database 260. The developer tool can have knowledge of what other software applications that exist on the portal service of the portal server 130, what services those software applications provide, how to package them into a PIC file, and how they will be included in a software offering. The developer tool may thus serve as a standardized API for the ISV 140 or other entity in developing a software application into a software offering.

Figure 3:
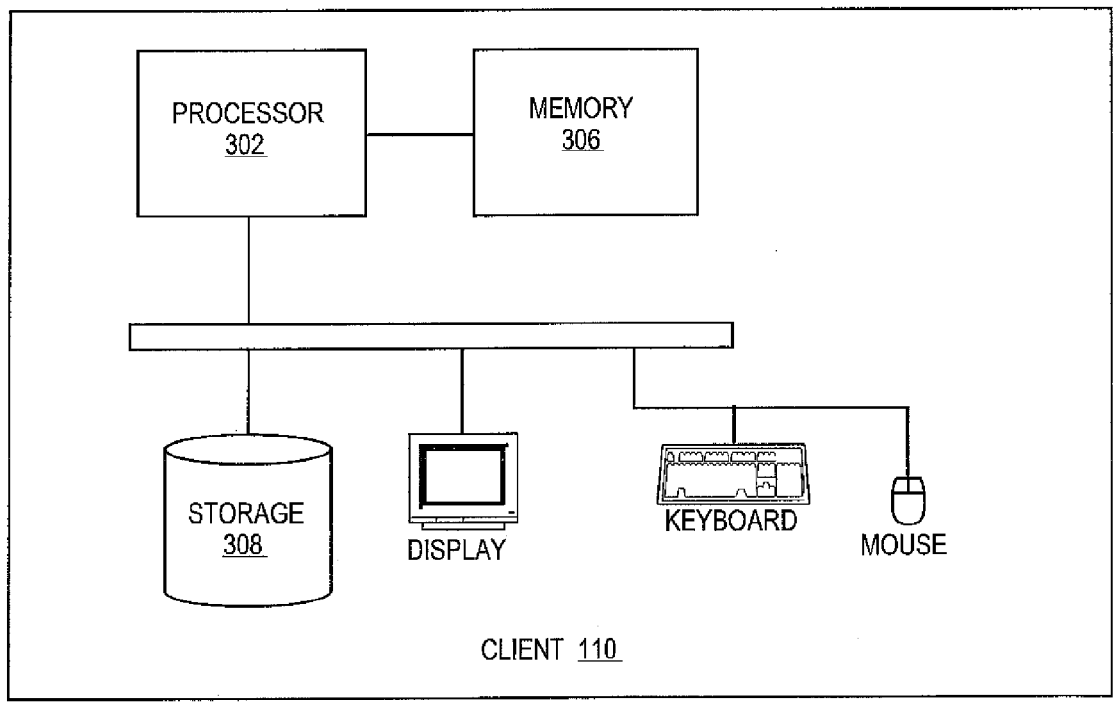
FIG. 3 shows a client device that is in accordance with an embodiment of the present invention.

FIG. 3 shows a computer system that can be used as user computing devices 110 in accordance with an embodiment of the present teachings. As shown in FIG. 3, the client 110 may include one or more processors, such as processor 302. Commands and data from the processor 302 are communicated over a communication bus 304. The client 110 may also include a main memory 306, such as a Random Access Memory (RAM) and storage 308. The storage 308 can include, for example, a hard disk drive and/or a removable storage drive, representing a floppy diskette drive, a magnetic tape drive, a compact disk drive, etc. A user at client 110 typically interfaces via a keyboard, mouse, and a display.

Figure 4:
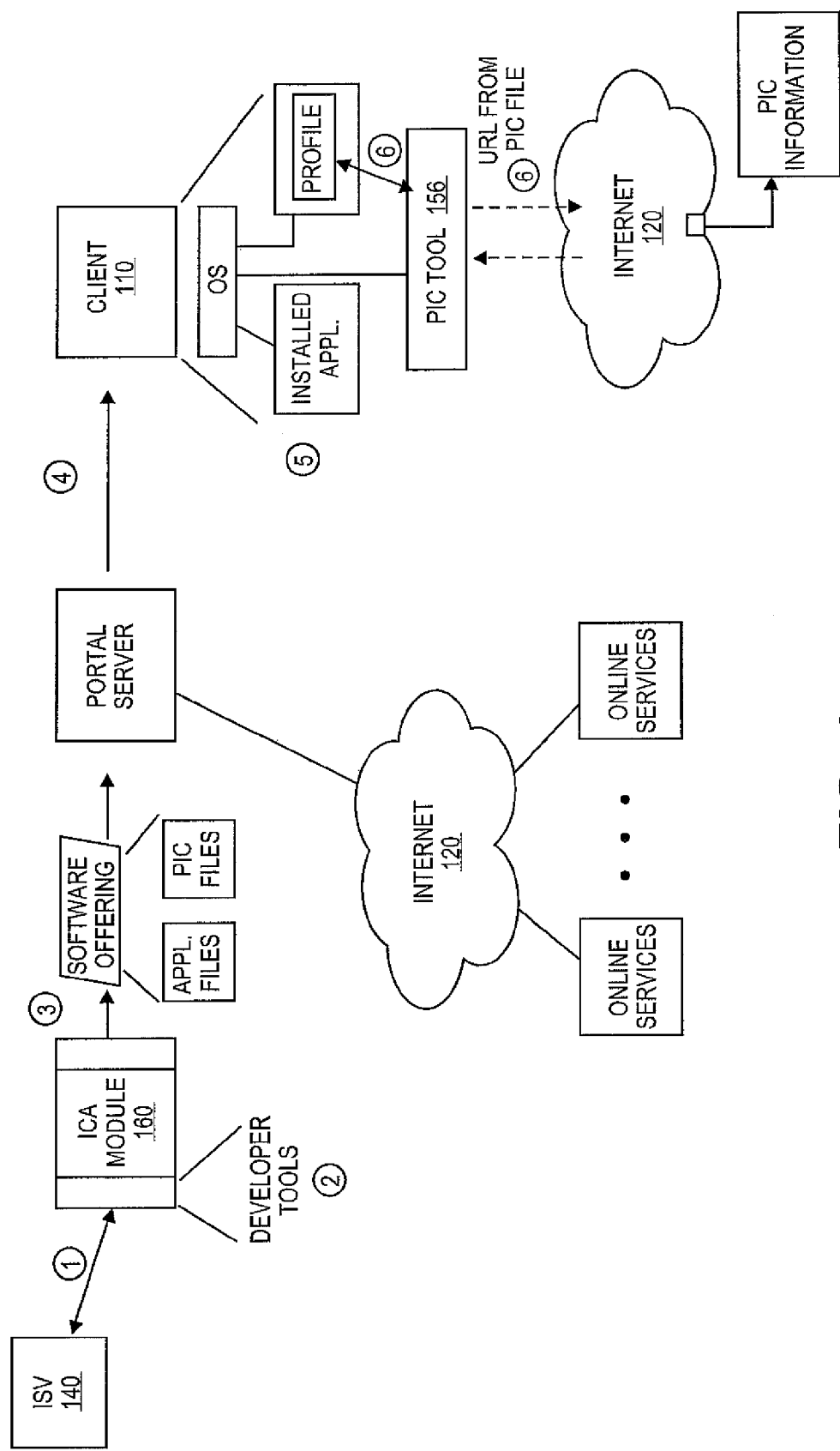
FIG. 4 illustrates a process flow of post-installation configuration in accordance with an embodiment of the present invention.

FIG. 4 shows a flow diagram of an embodiment of the present teachings. It should be readily apparent to those of ordinary skill in the art that the flow diagram shown in FIG. 4 represents a generalized flow diagram illustration and that other steps can be added or existing steps can be removed or modified while still remaining within the spirit and scope of the present teachings.

First, the software offering is generated. As noted, a software offering comprises not only the files, such as binaries, for the software application, but also PIC files that make the software application ready for use after installation. For example, an ISV 140 may access the portal server 130 and invoke the ICA manager module 210. The ICA manager module 205 may then direct the user interface module 220 to generate a selection GUI (previously described).

Second, the ISV 140 may utilize the selection GUI and select various options and online services for post-installation configuration of the software offering. For example, in some embodiments, the ICA manager module 210 is configured with a standardized set of templates and URLs for post-install configuration. Templates may be provided for various well known post-install tasks, such as, starting and stopping of services, editing configuration files, dialogs for user input, establishment of user accounts and passwords, configuration of network access, and the like. The ICA manager 210 may then provide this information to the PIC file manager 250, which verifies the PIC file and stores it in PIC file database 260. In some embodiments, this information is formatted as a XML file that is included with the software offering or made available via a URL included in the software offering.

Third, the RPM packager 230 creates the file or files for the software offering. For example, the RPM packager 230 may retrieve the application files from the RPM package database 240 and the PIC file from PIC file database 260 and packages them into a package for the software offering. As noted, in some embodiments, the RPM packager 230 generates the software offering in the form of a RPM package.

Fourth, the software offering is distributed to clients 110. For example, the portal server 130 may serve as a download location from which the software offerings are available. Of course, other distribution mechanisms, such as bit-torrent, mirrors, physical delivery of the software offering on a medium, such as a disk, compact disk or DVD.

Fifth, the software application in the software application is installed on the client 110. In addition, the PIC file in the software application may be stored on a directory on client 110 or a URL to the PIC file may be stored on client 110.

Sixth, on client 110, the PIC tool 150 detects the PIC file and launches execution to begin post-install configuration of the application. The PIC tool 150 may perform various automated tasks, such as starting and stopping services, and editing configuration files. The PIC tool 150 may also parse information from the PIC file and prompt the user for various configuration information needed for the software application as well as its prerequisite applications. The PIC tool 150 can have both a GUI and text user interface (TUI) depending upon a user's run level. The PIC tool 150 can be a standalone application that either runs in a cron or as a background service, e.g., in a tool bar. The PIC tool 150 can further query a remote server or service available on network 120 for additional information and can be accessed remotely. As a result, the software offering of the present invention provides not only a mechanism for installing software applications, but also a standardized, extensible mechanism for specifying and performing post-install configuration of these software applications.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been illustrated with respect to one or more implementations, alterations and/or modifications can be made to the illustrated examples without departing from the spirit and scope of the appended claims. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. It is intended that the specification and examples be considered as exemplary only, with a true scope and spirit of the teachings being indicated by the following claims.

What is claimed is:

1. A method comprising:
   determining, by a server, a software distribution, the software distribution comprising:
     files of an executable software program,
     a set of templates for executing post-installation tasks associated with a software application, the post-installation tasks comprising:
       starting and stopping of services;
       editing configuration files;
       providing dialogs for input from a user;
     establishing of user accounts and passwords; and
       configuring access to a network,
     a post-installation configuration (PIC) data file to customize the software application for operation with the files of the executable software program using the set of templates, the PIC file to provide data requirements of the software application to make the application ready for use after installation, and
     a post-installation configuration (PIC) tool comprising a file executable on a client to:
       detect the PIC file and launches execution to begin post-install configuration of the application,
       parse information from the PIC file and prompt the user for configuration information needed for the software application, and
       perform the post-installation tasks using the templates,
   determining a set of inter-dependencies between the software application and the software distribution;
   retrieving the set of templates for post-installation configuration of the software application based on the set of inter-dependencies;
   generating the PIC file;
   packaging the software application into an offering that comprises the PIC file, the PIC tool, the set of templates, and the files of the executable software program; and
   distributing the offering to the client over the network.

2. The method of claim 1, wherein packaging the software application into the offering comprises packaging the software application in a binary package format into the offering.

3. The method of claim 1, wherein packaging the software application into the offering comprises packaging the software application in a package management system package into the offering.

4. The method of claim 1, wherein retrieving the set of templates for post installation configuration comprises retrieving a template that configures services utilized by the software application.

5. The method of claim 1, wherein retrieving the set of templates for post installation configuration comprises retrieving a template that configures user accounts for the software application.

6. The method of claim 1, wherein retrieving the set of templates for post installation configuration comprises retrieving a template that configures network parameters utilized by the software application.

7. The method of claim 1, wherein generating the post-installation configuration data file comprises generating an extensible markup language file that comprises post-installation configuration information of the software application.

8. An apparatus comprising:
a memory to contain instructions; and
a processor to execute the instructions contained in the memory to:
determine a software distribution, the software distribution comprising:
files of an executable software program,
a set of templates for executing post-installation tasks associated with a software application, the post-installation tasks comprising:
starting and stopping of services;
editing configuration files;
providing dialogs for input from a user;
establishing of user accounts and passwords; and
configuring access to a network,
a post-installation configuration (PIC) data file to customize the software application for operation with the files of the executable software program using the set of templates, the PIC file to provide data requirements of the software application to make the application ready for use after installation, and
a post-installation configuration (PIC) tool comprising a file executable on a client to:
detect the PIC file and launches execution to begin post-install configuration of the application,
parse information from the PIC file and prompt the user for configuration information needed for the software application, and
perform the post-installation tasks using the templates,
retrieve the set of templates for post-installation configuration of the software application based on the set of inter-dependencies;
generate the PIC file;
package the software application into an offering that comprises the PIC file, the PIC tool, the set of templates, and the files of the executable software program; and
distribute the offering to the client over the network.

9. A non-transitory computer readable storage medium comprising computer-executable program code for causing a computer to perform operations comprising:

determining a software distribution, the software distribution comprising:
files of an executable software program,
a set of templates for executing post-installation tasks associated with a software application, the post-installation tasks comprising:
starting and stopping of services;
editing configuration files;
providing dialogs for input from a user;
establishing of user accounts and passwords; and
configuring access to a network,
a post-installation configuration (PIC) data file to customize the software application for operation with the files of the executable software program using the set of templates, the PIC file to provide data requirements of the software application to make the application ready for use after installation, and
a post-installation configuration (PIC) tool comprising a file executable on a client to:
detect the PIC file and launches execution to begin post-install configuration of the application,
parse information from the PIC file and prompt the user for configuration information needed for the software application, and
perform the post-installation tasks using the templates,
determining a set of inter-dependencies between the software application and the software distribution;
retrieving the set of templates for post-installation configuration of the software application based on the set of inter-dependencies;
generating the PIC file;
packaging the software application into an offering that comprises the PIC file, the PIC tool, the set of templates, and the files of the executable software program; and
distributing the offering to the client over the network.

10. The non-transitory computer readable storage medium of claim 9, wherein packaging the software application into the offering comprises packaging the software application in a binary package format into the offering.

11. The non-transitory computer readable storage medium of claim 9, wherein packaging the software application into the offering comprises packaging the software application in a package management system package into the offering.

12. The non-transitory computer readable storage medium of claim 9, wherein retrieving the set of templates for post installation configuration comprises retrieving a template that configures services utilized by the software application.

13. The non-transitory computer readable storage medium of claim 9, wherein retrieving the set of templates for post installation configuration comprises retrieving a template that configures user accounts for the software application.

14. The non-transitory computer readable storage medium of claim 9, wherein retrieving the set of templates for post installation configuration comprises retrieving a template that configures network parameters utilized by the software application.

15. The non-transitory computer readable storage medium of claim 9, wherein generating the post-installation configuration data file comprises generating an extensible markup language file that comprises post-installation configuration information of the software application.

* * * * *